(12) United States Patent
Ding

(10) Patent No.: US 11,197,236 B2
(45) Date of Patent: Dec. 7, 2021

(54) HOTSPOT SCANNING METHOD AND ELECTRONIC DEVICE

(71) Applicant: HUAWEI TECHNOLOGIES CO., LTD., Guangdong (CN)

(72) Inventor: Ji Ding, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 44 days.

(21) Appl. No.: 16/628,376

(22) PCT Filed: Jul. 4, 2017

(86) PCT No.: PCT/CN2017/091690
§ 371 (c)(1),
(2) Date: Jan. 3, 2020

(87) PCT Pub. No.: WO2019/006662
PCT Pub. Date: Jan. 10, 2019

(65) Prior Publication Data
US 2020/0187099 A1 Jun. 11, 2020

(51) Int. Cl.
*H04W 48/16* (2009.01)
*H04L 29/12* (2006.01)
(Continued)

(52) U.S. Cl.
CPC ............ *H04W 48/16* (2013.01); *H04L 61/10* (2013.01); *H04L 61/6022* (2013.01); *H04W 48/08* (2013.01); *H04W 48/20* (2013.01)

(58) Field of Classification Search
None
See application file for complete search history.

(56) References Cited

U.S. PATENT DOCUMENTS

2004/0110530 A1 6/2004 Alone et al.
2008/0130595 A1* 6/2008 Abdel-Kader ........ H04W 48/16
370/338
(Continued)

FOREIGN PATENT DOCUMENTS

CN 1485751 A 3/2004
CN 101202686 A 6/2008
(Continued)

OTHER PUBLICATIONS

Baidu.com [Online], "Phishing Wi-Fi", [retrieved on Mar. 25, 2020] retrieved fro: URL <https://baike.baidu.com/item/%E9%92%93%E9%B1%BCWi-Fi/6255863?fr=aladdin>, 8 pages (With English Translation).

(Continued)

*Primary Examiner* — Hong S Cho
(74) *Attorney, Agent, or Firm* — Fish & Richardson P.C.

(57) ABSTRACT

Embodiments of the present invention provide a hotspot scanning method and an electronic device. Whether a condition of initiating a hidden hotspot scanning is met is first determined. If the condition of initiating the hidden hotspot scanning is met, a name of a hidden hotspot is obtained. Then, the hidden hotspot scanning is initiated by using the name of the hidden hotspot. If the condition of initiating the hidden hotspot scanning is not met, the hidden hotspot scanning is not initiated. In this way, whether the condition of initiating the hidden hotspot scanning is met is determined before the hidden hotspot scanning is initiated. This effectively reduces a disclosure probability of the name of the hidden hotspot, thereby achieving a purpose of reducing a security risk in hotspot scanning.

15 Claims, 7 Drawing Sheets

(51) Int. Cl.
*H04W 48/08* (2009.01)
*H04W 48/20* (2009.01)
*H04W 12/50* (2021.01)

(56) References Cited

U.S. PATENT DOCUMENTS

| | | | |
|---|---|---|---|
| 2008/0198811 A1 | 8/2008 | Deshpande et al. | |
| 2010/0309815 A1* | 12/2010 | Yepez | H04L 12/4625 |
| | | | 370/254 |
| 2014/0128102 A1 | 5/2014 | Finlow-Bates | |
| 2017/0339628 A1 | 11/2017 | Chen | |
| 2018/0242233 A1 | 8/2018 | Hu et al. | |
| 2019/0364493 A1 | 11/2019 | Yu et al. | |

FOREIGN PATENT DOCUMENTS

| | | |
|---|---|---|
| CN | 101622887 A | 1/2010 |
| CN | 104782187 A | 7/2015 |
| CN | 106658672 A | 5/2017 |
| CN | 106793015 A | 5/2017 |
| CN | 106793016 A | 5/2017 |
| CN | 106804055 A | 6/2017 |
| EP | 1928125 A1 | 6/2008 |
| WO | 2016070331 A1 | 5/2016 |

OTHER PUBLICATIONS

PCT International Search Report and Written Opinion in International Application No. PCT/CN2017/091,690, dated Feb. 26, 2018, 14 pages (with English Translation).
Office Action issued in Chinese Application No. 201780091610.9 dated May 7, 2020, 15 pages (Wtih English Translation).
Cunche et al., "Linking wireless devices using information contained in Wi-Fi probe requests," Pervasive and Mobile Computing 11, XP028833795, Apr. 2014, 14 pages.
Extended European Search Report issued in European Application No. 17916550.1 dated Mar. 26, 2020, 10 pages.
Lindqvist et al., "Privacy-Preserving 802.11 Access-Point Discovery," WiSec '09: Proceedings of the second ACM conference on Wireless network security, XP058200438 , Mar. 2009, 8 pages.

* cited by examiner

← WLAN+

WLAN+  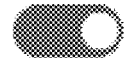

Help

Intelligently select a WLAN or mobile data
Perform connectivity detection (WLAN traffic possibly increases) on the WLAN to intelligently select an optimal network connection. You can select a default switching mode in a mobile network setting

Automatically enable or disable the WLAN
Automatically enable or disable a WLAN network at a specific location based on a record of a WLAN network that has been connected

Perform quality evaluation on an accessible hotspot
Automatically perform network quality evaluation on the accessible hotspot based on Internet access experience and suspend a stored hotspot that is automatically connected and that cannot access the Internet

Optimize free hotspot login experience
When a specific free hotspot is connected, automatically read a short message, fill in dynamic verification information, and log in for you (this function is available only in mainland China)

Protect hidden hotspot scanning
Initiate hidden hotspot scanning at a specific location or when a hidden hotspot with specific MAC is obtained through scanning. In another case, hidden hotspot scanning is not performed

FIG. 5

HOTSPOT SCANNING METHOD AND ELECTRONIC DEVICE

CROSS-REFERENCE TO RELATED APPLICATION

This application is a national stage of International Application No. PCT/CN2017/091690, filed on Jul. 4, 2017. The disclosures of the aforementioned application is hereby incorporated by reference in its entirety.

TECHNICAL FIELD

Embodiments of the present invention relate to the communications technologies, and in particular, to a hotspot scanning method and an electronic device.

BACKGROUND

With the development of electronic technologies, electronic devices (for example, a smartphone, a tablet computer, and a laptop computer) are more frequently used, and the electronic devices may be connected to a wireless local area network (WLAN) by using a WiFi hotspot. The WiFi hotspot includes a common hotspot and a hidden hotspot. However, a name of the hidden hotspot is disclosed when the hidden hotspot is scanned, and consequently, an opportunity is left for a malicious user. Some malicious users can trace a location of a user by tracing the name of the hidden hotspot. In addition, some malicious attackers may forge a hidden hotspot. In this case, the electronic device incorrectly considers that a target hotspot is obtained through scanning and automatically connects to the forged hidden hotspot, and all data on the electronic device is at risk. Therefore, how to securely complete hotspot scanning is a problem that needs to be resolved urgently.

SUMMARY

Embodiments of the present invention provide a hotspot scanning method and an electronic device, to reduce a security risk in hotspot scanning.

According to a first aspect, an embodiment of the present invention provides a hotspot scanning method, where the method includes: initiating common hotspot scanning; storing a result of the common hotspot scanning; and if a condition of initiating hidden hotspot scanning is met, obtaining a name of a hidden hotspot, initiating the hidden hotspot scanning by using the name of the hidden hotspot, and storing a result of the hidden hotspot scanning; or if a condition of initiating hidden hotspot scanning is not met, skipping initiating the hidden hotspot scanning.

With reference to a first aspect, in a first possible implementation, the condition of initiating the hidden hotspot scanning is specifically that a current location of the electronic device matches a location of the hidden hotspot stored in the memory.

With reference to the first possible implementation of the first aspect, in a second possible implementation, the obtaining a name of a hidden hotspot is specifically obtaining the name of the hidden hotspot based on the location of the hidden hotspot and a first mapping relationship, where the first mapping relationship includes a mapping relationship between the location of the hidden hotspot and the name of the hidden hotspot.

With reference to the first aspect, in a third possible implementation, the condition of initiating the hidden hotspot scanning is specifically that a MAC address of a current hidden hotspot matches a MAC address of the hidden hotspot stored in the memory.

With reference to the third possible implementation of the first aspect, in a fourth possible implementation, the obtaining a name of a hidden hotspot is specifically obtaining the name of the hidden hotspot based on a second mapping relationship and the MAC address of the hidden hotspot stored in the memory, where the second mapping relationship includes a mapping relationship between the MAC address of the hidden hotspot and the name of the hidden hotspot.

With reference to the first aspect, in a fifth possible implementation, the condition of initiating the hidden hotspot scanning is specifically that an instruction, entered by the user, to start the hidden hotspot scanning is received. The processor is configured to obtain the name of the hidden hotspot. Specifically, the electronic device obtains the name of the hidden hotspot from the memory. In this case, when the electronic device cannot obtain the current location, or location information is not updated to the first mapping relationship (for example, in enterprise networking, there is a hidden hotspot with a same name in a plurality of locations), or the MAC address is not updated to the second mapping relationship (for example, in enterprise networking, one hidden hotspot is deployed on a plurality of APs), the electronic device further provides the user with a button of "Start hidden hotspot scanning", so that the user can complete hidden hotspot scanning by tapping the button. In this way, the user does not need to manually enter a name of a hidden hotspot.

According to a second aspect, an embodiment of the present invention provides an electronic device, where the electronic device includes a WiFi chip, a processor, and a memory. The WiFi chip is configured to initiate common hotspot scanning. The memory is configured to store a result of the common hotspot scanning and a name of a hidden hotspot. The processor is configured to: if a condition of initiating hidden hotspot scanning is met, obtain the name of the hidden hotspot, and instruct the WiFi chip to initiate the hidden hotspot scanning; or if a condition of initiating hidden hotspot scanning is not met, skip instructing the WiFi chip to initiate the hidden hotspot scanning. The WiFi chip is further configured to initiate the hidden hotspot scanning by using the name of the hidden hotspot. The memory is further configured to store a result of the hidden hotspot scanning.

With reference to the second aspect, in a first possible implementation, the electronic device further includes a positioning apparatus. The positioning apparatus is configured to obtain a current location of the electronic device. The memory is further configured to store a location of the hidden hotspot. The condition of initiating the hidden hotspot scanning is that the current location of the electronic device matches the location of the hidden hotspot stored in the memory.

According to a third aspect, an embodiment of the present invention provides an electronic device. The electronic device is configured to have a function of implementing the method performed in the first aspect. The electronic device is implemented by using hardware/software. The hardware/software of the electronic device includes units corresponding to the foregoing functions.

According to a fourth aspect, an embodiment of the present invention provides an electronic device, including a processor, a memory, and a WiFi chip, where the processor executes a program stored in the memory to implement steps in the method provided in the first aspect.

Fifth aspect, an embodiment of the present invention provides a computer storage medium, configured to store a computer software instruction used by the foregoing electronic device. The computer storage medium includes a program designed for performing the foregoing aspects.

According to a sixth aspect, an embodiment of the present invention provides a hotspot scanning apparatus, where the apparatus includes: a first scanning module, configured to initiate common hotspot scanning; a first storage module, configured to store a result of the common hotspot scanning; a processing module, configured to: if a condition of initiating hidden hotspot scanning is met, obtain a name of a hidden hotspot, and instruct a second scanning module to initiate the hidden hotspot scanning; or if a condition of initiating hidden hotspot scanning is not met, skip instructing a second scanning module to initiate the hidden hotspot scanning; the second scanning module, configured to: after receiving an instruction of the second scanning module, initiate the hidden hotspot scanning by using the name of the hidden hotspot; and a second storage module, configured to store a result of the hidden hotspot scanning.

With reference to a sixth aspect, in a first possible implementation, the condition of initiating the hidden hotspot scanning is specifically that a current location of the electronic device matches a location of the hidden hotspot stored in the memory.

With reference to the first possible implementation of the sixth aspect, in a second possible implementation, the processing module is specifically configured to obtain the name of the hidden hotspot based on the location of the hidden hotspot and a first mapping relationship, where the first mapping relationship includes a mapping relationship between the location of the hidden hotspot and the name of the hidden hotspot.

With reference to the sixth aspect, in a third possible implementation, the condition of initiating the hidden hotspot scanning is specifically that a MAC address of a current hidden hotspot matches a MAC address of the hidden hotspot stored in the memory.

With reference to the third possible implementation of the sixth aspect, in a fourth possible implementation, the processing module is specifically configured to obtain the name of the hidden hotspot based on a second mapping relationship and the MAC address of the hidden hotspot stored in the memory, where the second mapping relationship includes a mapping relationship between the MAC address of the hidden hotspot and the name of the hidden hotspot.

Therefore, the embodiments of the present invention provide the hotspot scanning method and the electronic device. Whether the condition of initiating the hidden hotspot scanning is met is first determined. If the condition of initiating the hidden hotspot scanning is met, the name of the hidden hotspot is obtained. Then, the hidden hotspot scanning is initiated by using the name of the hidden hotspot. If the condition of initiating the hidden hotspot scanning is not met, the hidden hotspot scanning is not initiated. In this way, whether the condition of initiating the hidden hotspot scanning is met is determined before the hidden hotspot scanning is initiated. This effectively reduces a disclosure probability of the name of the hidden hotspot is, thereby achieving a purpose of reducing a security risk in hotspot scanning.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

FIG. 5 shows a user interface of a switch of a hidden hotspot scanning function on an electronic device according to an embodiment of the present invention;

DESCRIPTION OF EMBODIMENTS

The following describes technical solutions in the embodiments of the present invention with reference to the accompanying drawings.

The terms used in the embodiments of the present invention are merely for the purpose of illustrating specific embodiments, and are not intended to limit the present invention. The terms "a", "the" and "this" of singular forms used in the embodiments and the appended claims of the present invention are also intended to include plural forms, unless otherwise specified in the context clearly. It should also be understood that, the term "and/or" used herein indicates and includes any or all possible combinations of one or more associated listed items. It should further be understood that the term "include" used in the specification specifies presence of features, integers, steps, operations, elements, and/or components, without excluding presence or addition of one or more other features, integers, steps, operations, components, elements, and/or their combinations.

EMBODIMENTS

Figure 1:
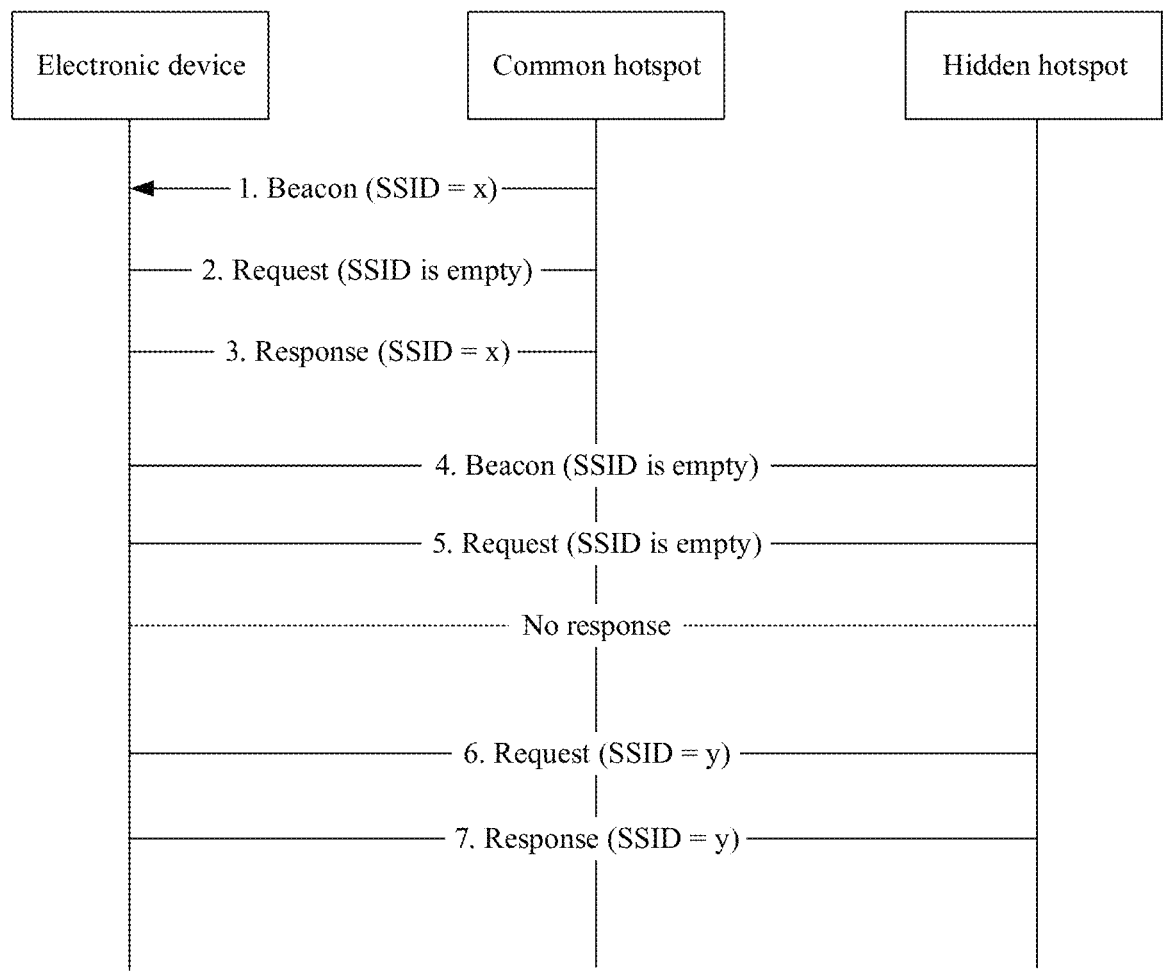
FIG. 1 shows an information exchange process when an electronic device scans a common hotspot and a hidden hotspot in the prior art.

FIG. 1 shows a message exchange process when an electronic device scans a common hotspot and a hidden hotspot in the prior art. As shown in FIG. 1, when the electronic device scans a surrounding WiFi hotspot, message exchange between the electronic device and the common hotspot is shown in steps 1 to 3. Step 1: The common hotspot periodically broadcasts a beacon frame and fills a service set identifier (Service Set Identifier, SSID for short below) field with a name x of the common hotspot. This is abbreviated as Beacon (SSID=x) below. After receiving the beacon frame, the electronic device may learn of the name of the common hotspot by using the SSID field. Step 2: The electronic device broadcasts a Probe Request message that an SSID is empty. This is abbreviated as Request (SSID is empty) below. Step 3: The common hotspot returns a Probe Response message and fills the SSID field with the name x of the common hotspot. This is abbreviated as Response (SSID=x) below. After receiving the Probe Response message, the electronic device may learn of the name of the common hotspot by using the SSID field.

When the electronic device scans the surrounding WiFi hotspot, message exchange between the electronic device and the hidden hotspot is shown in steps 4 to 7. Step 4: The hidden hotspot sets an SSID field to be empty in a beacon frame, that is, Beacon (SSID is empty). Step 5: The electronic device broadcasts a Probe Request message that an SSID is empty, that is, Request (SSID is empty). The hidden hotspot does not return when receiving Request (SSID is empty). In this way, when performing a scanning operation, the electronic device neither can obtain a name of the hidden hotspot by monitoring the beacon frame nor can obtain the name of the common hotspot by using the Probe Response message, so that the hidden hotspot is "invisible" to a common user. Only after a message of Probe Request (SSID=y) sent by the electronic device is received, Probe Response (SSID=y) is returned to the corresponding electronic device, as shown in step 6 and step 7, so that the hidden hotspot is displayed on the electronic device.

Figure 2:
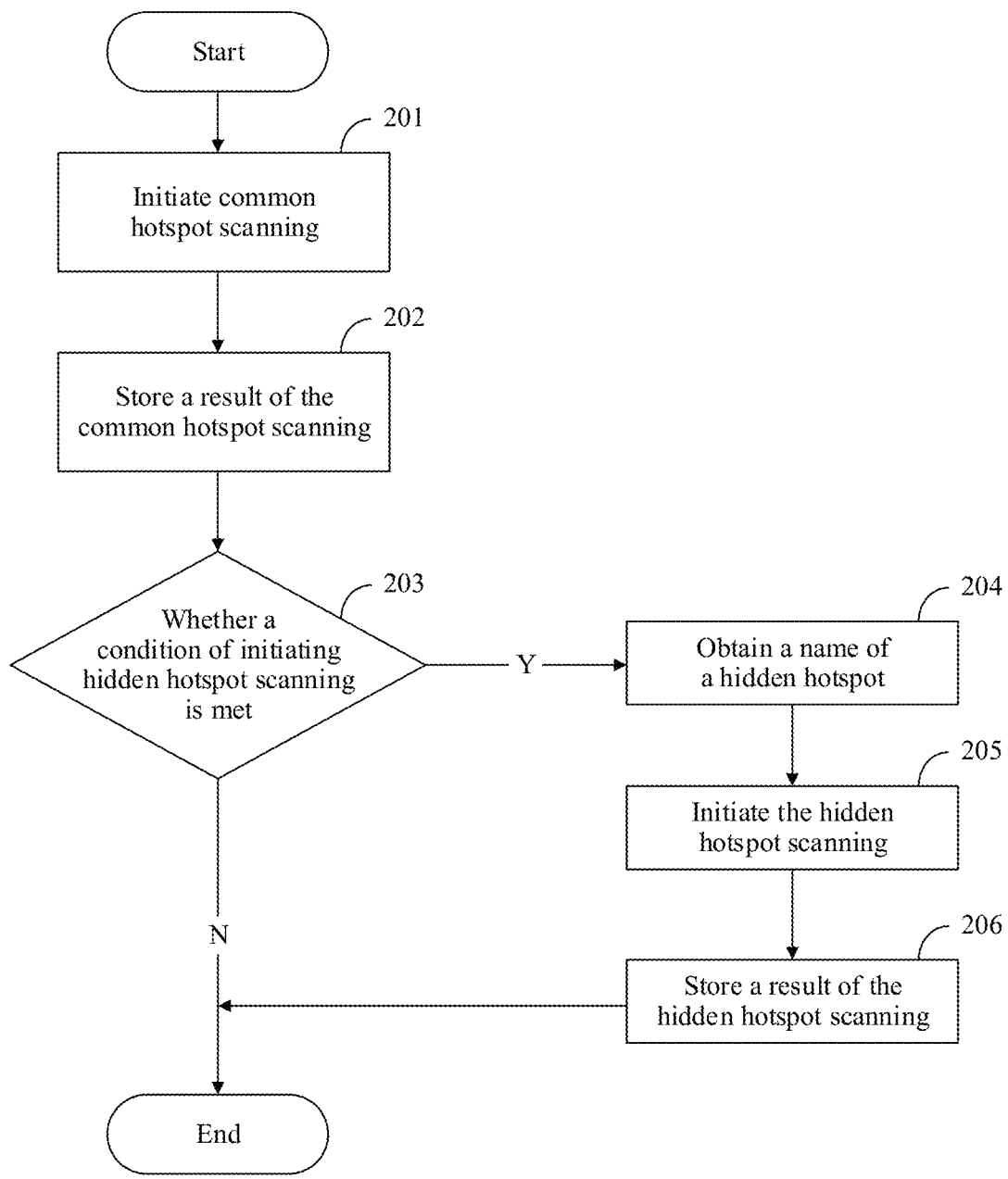
FIG. 2 is a flowchart of a hotspot scanning method according to an embodiment of the present invention.

FIG. 2 is a flowchart of a hotspot scanning method according to an embodiment of the present invention. As shown in FIG. 2, the method includes the following steps.

Step 201: An electronic device initiates common hotspot scanning.

The electronic device listens to a beacon frame, broadcasts a message of Request (SSID is empty), and may obtain one or more common hotspots based on a received response message and the beacon frame obtained through listening. The one or more common hotspots are used as a result of the common hotspot scanning.

The beacon frame obtained through listening is as follows:

```
IEEE 802.11 Beacon frame, Flags: ...
IEEE 802.11 wireless LAN management frame
  Fixed parameters
  Tagged parameters
    Tag: SSID parameter set: x
    Tag Number: SSID parameter set (0)
    Tag length: 1
    SSID: x
```

The message of Request (SSID is empty) is broadcast as follows:

```
IEEE 802.11 Probe Request, Flags: ...
IEEE 802.11 wireless LAN management frame
  Tagged parameters
    Tag: SSID parameter set: Broadcast
    Tag Number: SSID parameter set (0)
    Tag length: 0
    SSID: 0
```

The common hotspot returns the following information:

```
IEEE 802.11 Probe Response, Flags: ...
IEEE 802.11 wireless LAN management frame
  Fixed parameters
  Tagged parameters
    Tag: SSID parameter set: x
    Tag Number: SSID parameter set (0)
    Tag length: 1
    SSID: x
```

From the beacon frame or the response message, the common hotspot that has the name of x and that is obtained through scanning may be learned. The beacon frame or the response message further includes information such as an encryption manner. For details, refer to implementation of the prior art. Details are not provided in this embodiment of the present invention.

Step 202: Store the result of the common hotspot scanning.

It should be noted that the result of the common hotspot scanning may be all spots obtained through the common hotspot scanning, for example, including a hotspot with an empty name and a hotspot with a non-empty name. In this case, work is left for subsequent processing. For example, when a hotspot obtained through scanning needs to be displayed on the electronic device, a hotspot with an empty name is filtered out, and a hotspot with a non-empty name is displayed on the electronic device (the hotspot with the empty name cannot be displayed on the electronic device). The result of the common hotspot scanning may alternatively be a hotspot with a non-empty name. In this case, subsequent processing is omitted. When the hotspot obtained through common scanning needs to be used, the stored result of the common hotspot scanning is directly used.

It should be noted that, for the result of the common hotspot scanning, reference may be made to the result of the hotspot scanning in the prior art. For a storage manner, refer to the prior art. Details are not described herein.

Step 203: Determine whether a condition of initiating hidden hotspot scanning is met. If the condition of initiating the hidden hotspot scanning is met, step 204 is performed. Otherwise, the hidden hotspot scanning is not initiated, and the process ends.

Optionally, the condition of initiating the hidden hotspot scanning is specifically receiving an instruction, entered by a user, to start the hidden hotspot scanning. After receiving the instruction, entered by a user, to start the hidden hotspot scanning, the electronic device obtains a name of the hidden hotspot from a memory.

Optionally, the condition of initiating the hidden hotspot scanning is specifically that a current location of the electronic device matches a location of the hidden hotspot stored in the memory.

It should be noted that the current location of the electronic device may be a number of a base station connected to the electronic device, for example, a cell 01, or may be a location obtained by a GPRS system of the electronic device, for example, (121 degrees 48 minutes east longitude, 31 degrees 22 minutes north latitude), or may be a location obtained by a positioning system of the electronic device, for example, No. 1800 Jinhai Road.

It should be noted that the first mapping relationship may be one-to-many mapping or many-to-one mapping. To be specific, one location may be corresponding to names of a plurality of hidden hotspots, and a name of one hidden hotspot may be corresponding to a plurality of locations.

The following uses an example to describe content included in the first mapping relationship, for example, "No. 1800 Jinhai Road, x", "cell 01, y", or "(121 degrees 48 minutes east longitude, 31 degrees 22 minutes north latitude), z", where x, y, and z are names of hidden hotspots.

Optionally, the condition of initiating the hidden hotspot scanning is specifically that a media access control (Media Access Control, MAC) address of the current hidden hotspot matches a MAC address of the hidden hotspot stored in the memory. The current hidden hotspot is a hotspot with an empty name in the result of the common hotspot scanning.

It should be noted that the first mapping relationship and a second mapping relationship may be stored when the electronic device connects to the hidden hotspot for the first time, or may be stored each time the electronic device connects to the hidden hotspot, or may be stored by receiving input of the user by using an entry provided in a user interface of the electronic device.

It should be noted that "matching" mentioned in this embodiment of the present invention may be partial matching, or may be complete matching. A specific matching manner needs to be set based on an actual requirement.

The complete matching may be used when the location of the electronic device is identified by using a cell ID. For example, when the current location of the electronic device is the cell 01, and the location of the hidden hotspot stored in the memory is also the cell 01, it is determined that the current location of the electronic device and the location of the hidden hotspot match.

The partial matching may be used when the location of the electronic device is identified by using longitude and latitude. To be specific, if a distance between the current location of the electronic device and the location of the hidden hotspot falls within a preset range, it is determined that the current location of the electronic device and the location of the hidden hotspot match. For example, when the current location of the electronic device is "(121 degrees 48 minutes east longitude, 31 degrees 22 minutes north latitude)", and the location of the hidden hotspot stored in the memory is "(121 degrees 50 minutes east longitude, 31 degrees 20 minutes north latitude)", it is determined that the current location of the electronic device and the location of the hidden hotspot match.

The MAC address of the current hidden hotspot may completely match the MAC address of the hidden hotspot stored in the memory. To be specific, 12 characters are completely consistent (applicable to a home hotspot). For example, only when the MAC address of the current hidden hotspot and the MAC address of the hidden hotspot stored in the memory are both 00:11:22:33:44:55, it is determined that the MAC address of the current hidden hotspot and the MAC address of the hidden hotspot stored in the memory match. Alternatively, the MAC address of the current hidden hotspot may partially match the MAC address of the hidden hotspot stored in the memory. For example, the first 10 characters are completely consistent (applicable to an enterprise hotspot). For example, it is determined that 00:11:22:33:44:55 matches 00:11:22:33:44:55, 00:11:22:33:44:66, 00:11:22:33:44:35, and 00:11:22:33:44:25.

It should be noted that if the user deletes the hidden hotspot in the electronic device, the electronic device automatically deletes records related to the hidden hotspot in the first mapping relationship and the second mapping relationship. Alternatively, in the user interface provided on the electronic device, the user is allowed to manually delete records in the first mapping relationship and the second mapping relationship. The user may select and delete one of the records, or may select and delete a plurality of the records, or may select and delete one type of records, for example, delete all records corresponding to one piece of location information, delete all records corresponding to a name of one hidden hotspot, or delete all records.

Step 204: Obtain the name of the hidden hotspot.

Optionally, the name of the hidden hotspot may be obtained based on the first mapping relationship and the location that is of the hidden hotspot and that matches the current location of the hidden hotspot in step 203. The first mapping relationship includes a mapping relationship between the location of the hidden hotspot and the name of the hidden hotspot.

Optionally, the name of the hidden hotspot may alternatively be obtained from a preset storage location of the electronic device.

Optionally, the name of the hidden hotspot may be obtained based on the second mapping relationship and the MAC address that is of the hidden hotspot stored in the memory and that matches the MAC address of the current hidden hotspot in step 203. The second mapping relationship includes a mapping relationship between the MAC address of the hidden hotspot and the name of the hidden hotspot.

Step 205: Initiate the hidden hotspot scanning by using the name of the hidden hotspot.

A message of Probe Request (SSID=y) is broadcast as follows:

```
IEEE 802.11 Probe Request, Flags: ...
IEEE 802.11 wireless LAN management frame
    Tagged parameters
        Tag: SSID parameter set: Broadcast
            Tag Number: SSID parameter set (0)
            Tag length: 1
                SSID: y
```

After receiving the message of Probe Request (SSID=y), a hidden hotspot y obtains a name of a hidden hotspot carried in the Probe Request message. If the obtained name of the hidden hotspot is the same as a name of the hidden hotspot y, the hidden hotspot y determines that the electronic device may access the hidden hotspot y, and returns the message of Probe Response (SSID=y) to the electronic device. The Probe Response message is as follows:

```
IEEE 802.11 Probe Response, Flags: ...
IEEE 802.11 wireless LAN management frame
    Tagged parameters
        Tag: SSID parameter set: y
            Tag Number: SSID parameter set (0)
            Tag length: 1
                SSID: y
```

Step 206: Store a result of the hidden hotspot scanning.

It should be noted that, for the result of the hidden hotspot scanning, reference may be made to the result of the hotspot scanning in the prior art. For a storage manner, refer to the prior art. Details are not described herein.

Optionally, the result of the common hotspot scanning and the result of the hidden hotspot scanning may be stored in one database table, and one field is used to mark the common hotspot or the hidden hotspot. The result of the common hotspot scanning and the result of the hidden hotspot scanning may alternatively be stored in different database tables.

It should be noted that only storage of the result of the common hotspot scanning and the result of the hidden hotspot scanning is described in this embodiment of the present invention, and a subsequent operation is not a focus of this embodiment of the present invention. Therefore, the subsequent operation is not described in the embodiment of the present invention in detail. For details, refer to implementation of the prior art.

For example, if a result of hotspot scanning is to be displayed on the electronic device in the prior art, a result of common scanning and a result of hotspot node scanning are displayed on the electronic device. If one hotspot is selected from a plurality of scanning results according to a rule, for automatic connection in the prior art, the electronic device selects one hotspot from the result of the common hotspot scanning and the result of the hidden hotspot scanning according to a rule, for automatic connection. For the specific rule, refer to the prior art. This is not described in detail in this embodiment of the present invention.

Therefore, this embodiment of the present invention provides the hotspot scanning method. Whether the condition of initiating the hidden hotspot scanning is met is first determined. If the condition of initiating the hidden hotspot scanning is met, the name of the hidden hotspot is obtained, and then the hidden hotspot scanning is initiated by using the name of the hidden hotspot. If the condition of initiating the hidden hotspot scanning is not met, the hidden hotspot scanning is not initiated. In this way, whether the condition of initiating the hidden hotspot scanning is determined before the hidden hotspot scanning is initiated. This effectively reduces a disclosure probability of the name of the hidden hotspot, thereby achieving a purpose of reducing a security risk in hotspot scanning.

Figure 3:
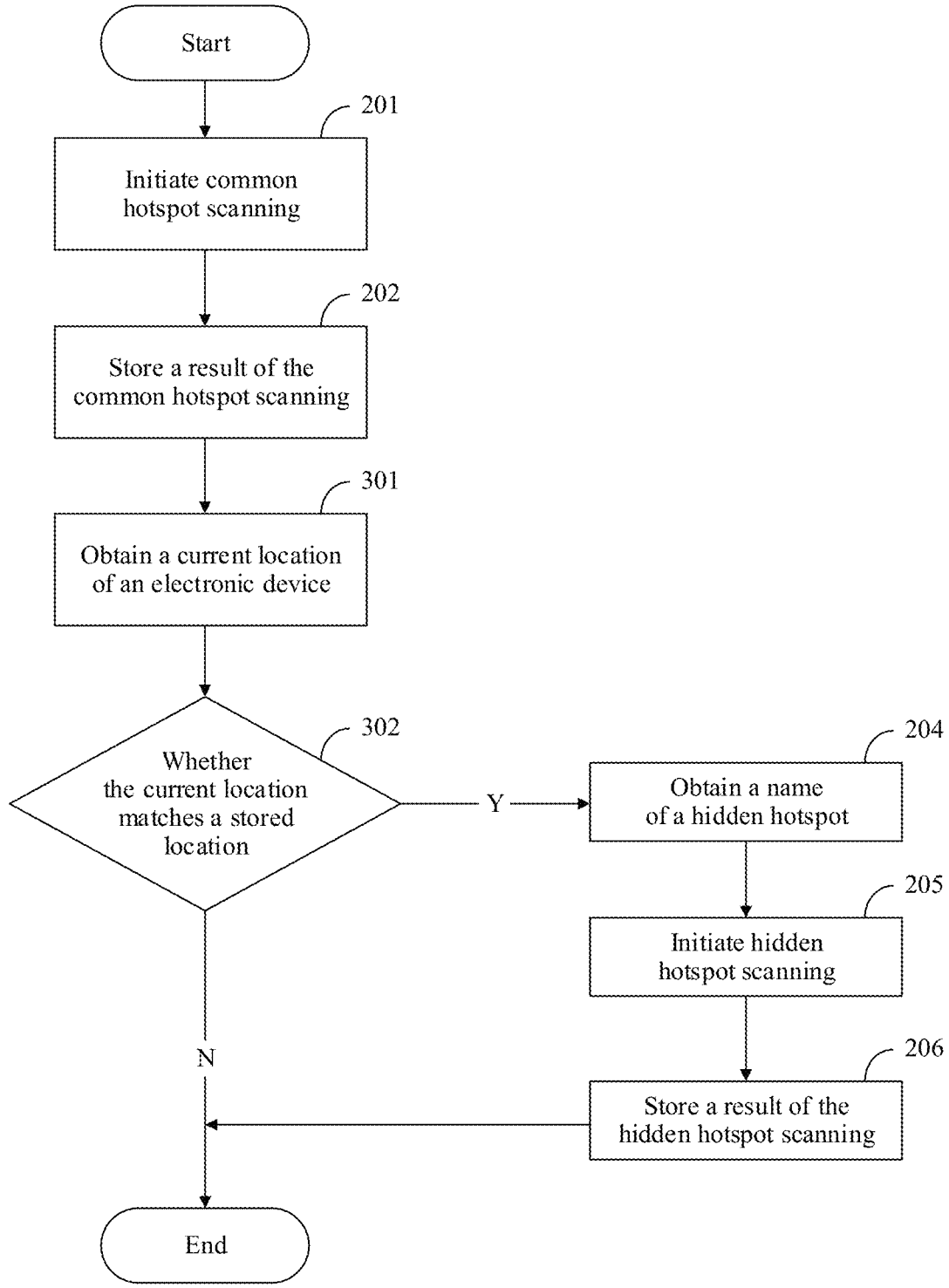
FIG. 3 is a flowchart of another hotspot scanning method according to an embodiment of the present invention.

FIG. 3 is a flowchart of another hotspot scanning method according to an embodiment of the present invention. FIG. 3 is a partial modification made based on FIG. 2. The following describes only a modified part in detail. For a same part, refer to a related description in FIG. 2.

Step 203 includes the following steps:

Step 301: Obtain a current location of an electronic device.

Step 302: Determine whether the current location of the electronic device matches a location of the hidden hotspot stored in the memory. If the current location of the electronic device matches the location of the hidden hotspot stored in the memory, step 204 is performed. Otherwise, hidden hotspot scanning is not initiated, and a process ends.

It should be noted that a sequence of step 201 and step 202 and a sequence of step 301 and step 302 are interchangeable. To be specific, step 201 and step 202 are first performed, and then step 301 and step 302 are performed. Alternatively, step 301 and step 302 are first performed, and then step 201 and step 202 are performed.

The following uses a mobile phone as an example to describe a process of performing this embodiment of the present invention.

The mobile phone does not initiate hidden hotspot scanning when the mobile phone is not in a location of a hidden hotspot:

1. The mobile phone obtains a current location, for example, P1.

2. A first mapping relationship stored in the mobile phone is traversed based on P1, and a current location P1 is not in the first mapping relationship.

3. The mobile phone initiates common hotspot scanning and sends a message of Probe Request (SSID is empty).

4. The mobile phone obtains and stores a common hotspot list.

The mobile phone initiates the hidden hotspot scanning when the mobile phone is in the location of the hidden hotspot (step 301 and step 302 are first performed, and then step 201 and step 202 are performed):

1. The mobile phone obtains a current location, for example, P2.

2. The first mapping relationship stored in the mobile phone is traversed based on P2, and a current location P2 is in the first mapping relationship.

3. The mobile phone obtains names of two hidden hotspots: test1 and test2 based on a record corresponding to P2 in the first mapping relationship.

4. The mobile phone initiates the common hotspot scanning and the hidden hotspot scanning, to be specific, sends messages of Probe Request (SSID is empty), and Probe Request (SSID="test1") and Probe Request (SSID="test2").

5. The mobile phone obtains and stores a list of a common hotspot and hidden hotspots: test1 and test2.

The mobile phone initiates the hidden hotspot scanning when the mobile phone is in the location of the hidden hotspot (step 201 and step 202 are first performed, and then step 301 and step 302 are performed):

1. The mobile phone initiates common hotspot scanning (Probe Request (SSID is empty)):

2. The mobile phone obtains and stores a common hotspot list.

3. The mobile phone obtains a current location P2.

4. The first mapping relationship stored in the mobile phone is traversed based on P2, and a current location P2 is in the first mapping relationship.

5. The mobile phone obtains names of two hidden hotspots: test1 and test2 based on a record corresponding to P2 in the first mapping relationship.

6. The mobile phone initiates the hidden hotspot scanning, to be specific, sends messages of Probe Request (SSID="test1") and Probe Request (SSID="test2").

7. The mobile phone obtains and stores a list of the hidden hotspots: test1 and test2.

Figure 4:
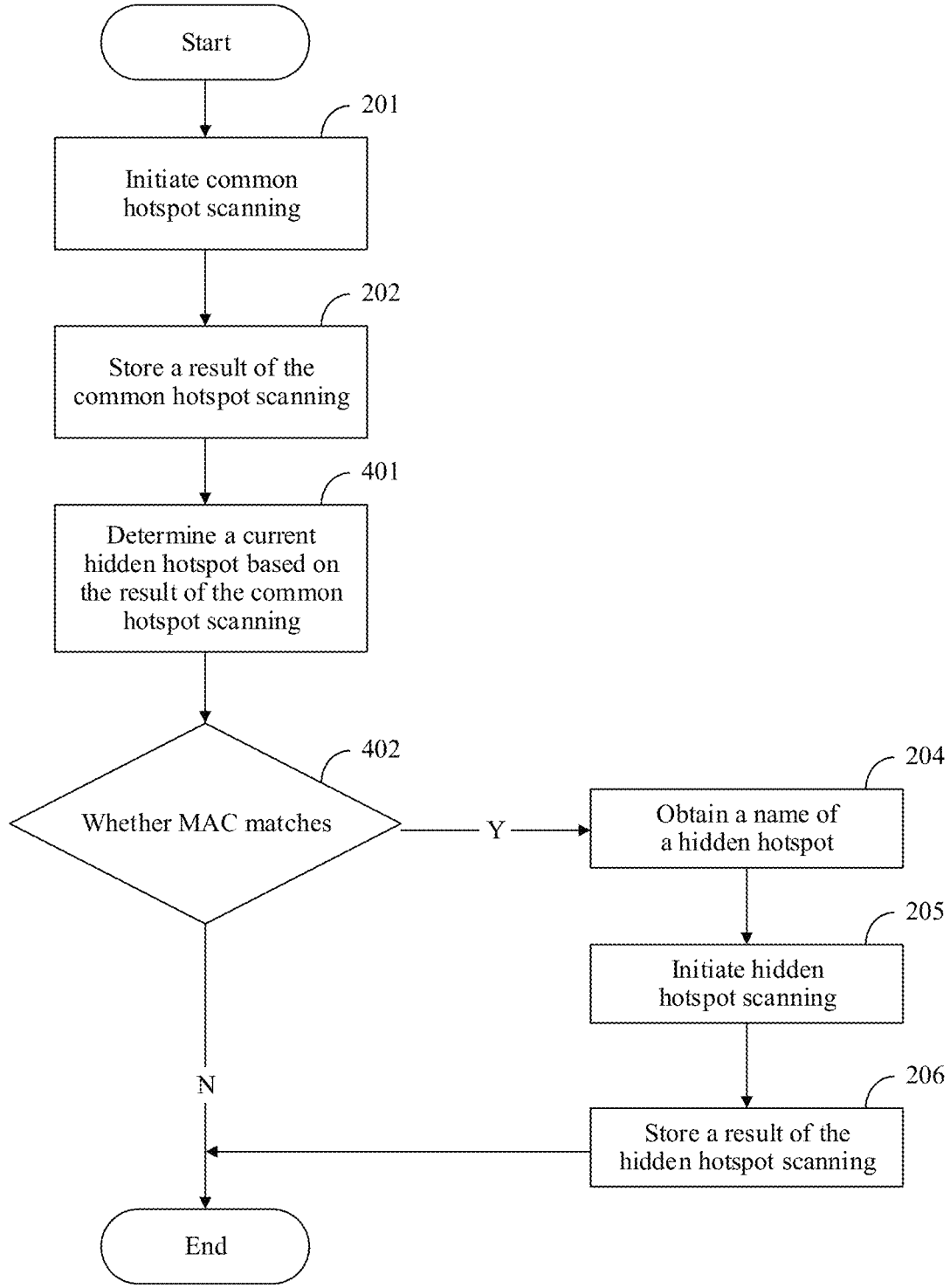
FIG. 4 is a flowchart of still another hotspot scanning method according to an embodiment of the present invention.

FIG. 4 is a flowchart of still another hotspot scanning method according to an embodiment of the present invention. FIG. 4 is a partial modification made based on FIG. 2. The following describes only a modified part in detail. For a same part, refer to a related description in FIG. 2.

Step 203 includes the following steps:

Step 401: Determine a current hidden hotspot based on the result of the common hotspot scanning, where the current hidden hotspot is a hotspot with an empty name in the result of the common hotspot scanning.

Step 402: Determine whether a MAC address of the current hidden hotspot matches a MAC address of the hidden hotspot stored in the memory. If the MAC address of the current hidden hotspot matches the MAC address of the hidden hotspot stored in the memory, step 204 is performed. Otherwise, hidden hotspot scanning is not initiated, and a process ends.

It should be noted that a MAC address and a hidden hotspot name may be in a one-to-one relationship. To be specific, one MAC address may correspond to only one hidden hotspot name. Alternatively, the MAC address and the hidden hotspot name may be in a many-to-one relationship. To be specific, one hidden hotspot name may correspond to a plurality of MAC addresses.

The following uses a mobile phone as an example to describe a process of performing this embodiment of the present invention.

The mobile phone does not store the MAC address of the hidden hotspot, and does not initiate the hidden hotspot scanning.

1. The mobile phone initiates common hotspot scanning.

2. Store a result of the common hotspot scanning.

3. Obtain a hotspot whose SSID field is empty in the result of the common hotspot scanning, where a MAC address of the hotspot is 00:11:22:33:44:55 and is referred to as MAC 1 below.

4. Perform matching based on the MAC 1 and a second mapping relationship stored in the mobile phone.

5. If no record that matches the MAC 1 can be found, the hidden hotspot scanning is not initiated.

It should be noted that a hotspot list is a list of hotspots with a non-empty name in the result of the common hotspot scanning.

The mobile phone stores the MAC address of the hidden hotspot and initiates the hidden hotspot scanning (applicable to a home hidden hotspot, complete matching):

1. The mobile phone initiates common hotspot scanning.
2. Obtain a result of the common hotspot scanning.
3. Obtain a hotspot with an empty name in the result of the common hotspot scanning, where a MAC address of the hotspot is 00:11:22:33:44:55 and is referred to as MAC 1 below.
4. Perform matching based on the MAC 1 and a second mapping relationship stored in the mobile phone.
5. Find, in the stored second mapping relationship, a record "test1" that completely matches the MAC 1.
6. The mobile phone initiates the hidden hotspot scanning (Probe Request (SSID="test1")), and obtains the hidden hotspot test1 through scanning.

It should be noted that a hotspot list is a list of hotspots with a non-empty name in the result of the common hotspot scanning, and "test1" is added in the hotspot list.

The mobile phone stores the MAC address of the hidden hotspot and initiates the hidden hotspot scanning (applicable to an enterprise hidden hotspot, partial matching):

1. The mobile phone initiates common hotspot scanning.
2. Obtain a result of the common hotspot scanning.
3. Obtain a hotspot with an empty name in the result of the common hotspot scanning, where a MAC address of the hotspot is (00:11:22:33:44:66) and is referred to as MAC 2 below.
4. Perform matching based on the MAC 2 and a second mapping relationship stored in the mobile phone.
5. Find, in the stored second mapping relationship, a record "test1" that partially matches the MAC 2.
6. The mobile phone initiates the hidden hotspot scanning and sends a message of Probe Request (SSID="test1").
7. Obtain a hidden hotspot test1.

It should be noted that a hotspot list is a list of hotspots with a non-empty name in the result of the common hotspot scanning, and "test1" is added in the hotspot list.

It should be noted that a rule of complete matching or partial matching may be stored in the second mapping relationship. For example, the second mapping relationship includes a MAC address, hidden hotspot information, and a matching rule. The following uses an example to describe how to perform matching.

In case of the complete matching, a record stored in the second mapping relationship is "00:11:22:33:44:55, test1, ALL". In this case, matching succeeds only when the MAC address obtained through scanning is 00:11:22:33:44:55.

In case of the partial matching, a record stored in the second mapping relationship is "00:11:22:33:44:55, test1, FF:FF:FF:FF:00". To be specific, matching succeeds when the first ten bits of the MAC address are the same. It is assumed that a MAC address obtained through scanning is 00:11:22:33:44:66, and a matching rule in the second mapping relationship is FF:FF:FF:FF:FF:00, the first 10 bits of "00:11:22:33:44:66" and "00:11:22:33:44:55" are consistent. Therefore, matching of the hidden hotspot succeeds.

It should be noted that a matching rule generation method may be that the electronic device scans a hotspot in a current environment, obtains MAC addresses of all hidden hotspots, and generate a matching rule covering all the MAC addresses. If after initiating scanning of a hidden hotspot with a name of "test1", the electronic device receives three different MAC addresses: "00:11:22:33:44:55", "00:11:22:33:44:66", and "00:11:22:33:44:77", the electronic device generates one matching rule: FF:FF:FF:FF:FF:00, and stores a record of "00:11:22:33:44:55, FF:FF:FF:FF:FF:00" in the second mapping relationship.

It should be noted that the matching rule may alternatively be manually set by a user, and the matching rule may be stored in a fixed location, or may be stored in the second mapping relationship. The matching rule may be set to a global rule. To be specific, all hotspot names use one matching rule. Alternatively, the matching rule may be set to a local rule. To be specific, each hotspot name uses a different matching rule.

It should be understood that although terms "first" and "second" are used in the embodiment of the present invention to describe the mapping relationships, the mapping relationships are not limited by the terms. These terms are merely used to distinguish between mapping devices. For example, without departing from the scope of the embodiments of the present invention, the first mapping relationship may also be referred to as a mapping relationship, and similarly, the second mapping relationship may also be referred to as the first mapping relationship.

It should be noted that a hidden hotspot scanning protection function in this embodiment of the present invention may alternatively be set as optional. Refer to FIG. 5, for example, integrating to lower-level menu of a WLAN+ that improves network intelligent experience, or separately setting an option, so that the user can choose to use or not to use the function.

Figure 6:
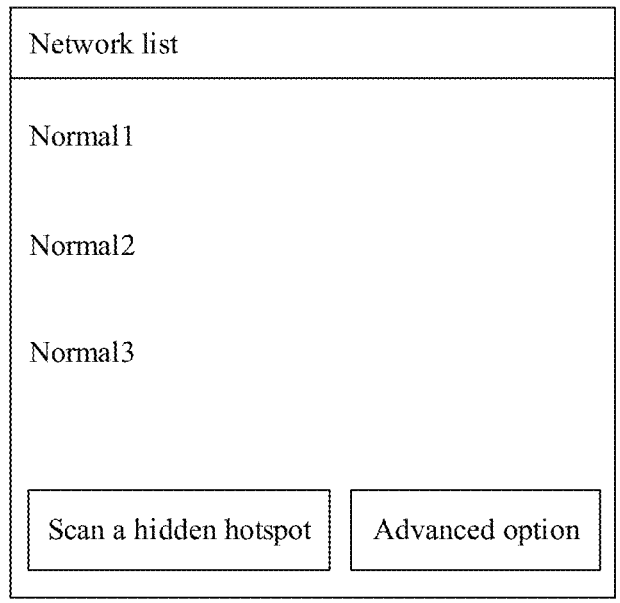
FIG. 6 shows a user interface before hidden hotspot scanning on an electronic device according to an embodiment of the present invention.
Figure 7:
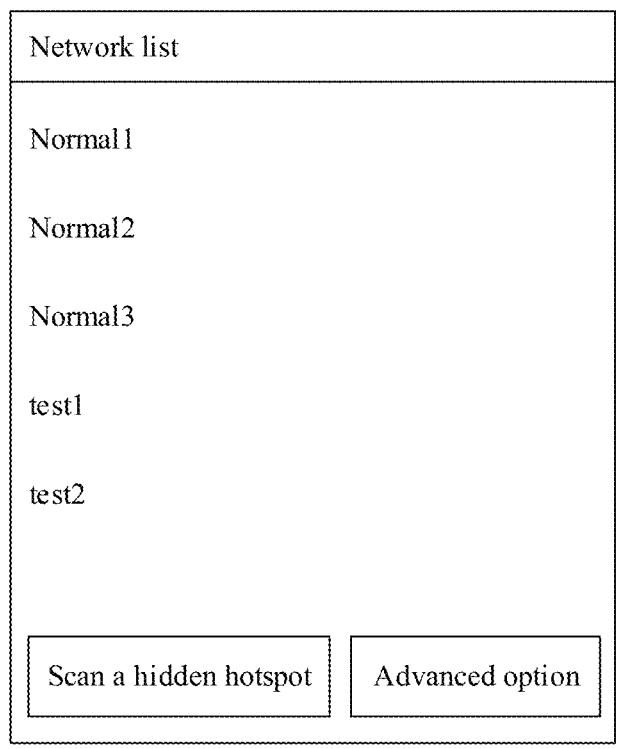
FIG. 7 shows a user interface after hidden hotspot scanning on an electronic device according to an embodiment of the present invention.

Optionally, the condition of initiating the hidden hotspot scanning is specifically receiving the instruction, entered by the user, to start the hidden hotspot scanning. After receiving the instruction, entered by the user, to start the hidden hotspot scanning, the electronic device obtains the name of the hidden hotspot from the memory. Referring to FIG. 6, the user may tap a "Scan a hidden hotspot" button, and then the electronic device obtains a name of a stored hidden hotspot. It is assumed that the name of the stored hidden hotspot includes "test1" and "test2". The electronic device sends messages of Probe Request (SSID="test1") and a Probe Request (SSID="test2") to obtain a scanning result, as shown in FIG. 7.

Therefore, when the electronic device disables a hidden hotspot scanning protection button, or the electronic device cannot obtain a current location, or location information is not updated to the mapping relationship (for example, in enterprise networking, there is a hidden hotspot with a same name in a plurality of locations), or the MAC address is not updated to the second mapping relationship (for example, in enterprise networking, one hidden hotspot is deployed on a plurality of APs), the electronic device further provides the user with a button of "Start hidden hotspot scanning", so that the user can complete hidden hotspot scanning by tapping the button. In this way, the user does not need to manually enter a name of a hidden hotspot.

Figure 8:
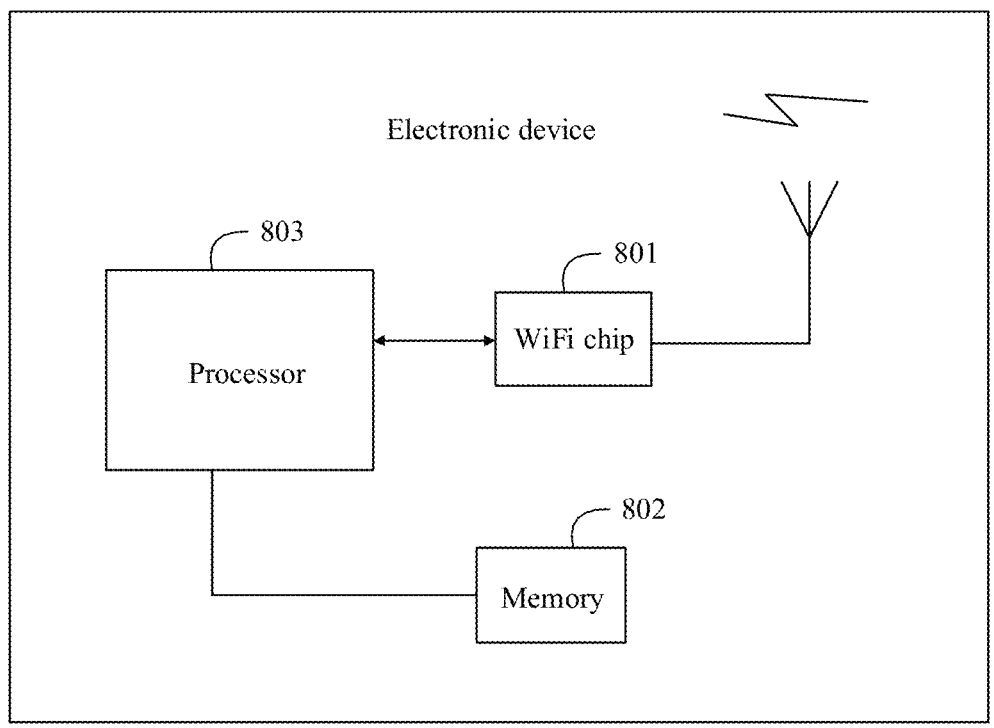
FIG. 8 is a schematic structural diagram of an electronic device according to an embodiment of the present invention.

FIG. 8 is a schematic structural diagram of an electronic device according to an embodiment of the present invention.

In a possible example, a structure of the electronic device includes a WiFi chip 801, a memory 802, and a processor 803. The WiFi chip 801 is configured to initiate hotspot scanning, including common hotspot scanning and hidden hotspot scanning. The memory 802 is configured to store a program and data in the foregoing electronic device described in FIG. 2 to FIG. 4. The processor 803 is configured to execute the program stored in the memory 802. For details of a process of the program, refer to FIG. 2 to FIG. 4.

Therefore, this embodiment of the present invention provides the electronic device. If a condition of initiating the hidden hotspot scanning is met, the processor 803 obtains a name of a hidden hotspot, and then instructs the WiFi chip 801 to initiate the hotspot scanning. Whether the condition of initiating the hidden hotspot scanning is met is first determined. If the condition of initiating the hidden hotspot scanning is met, the name of the hidden hotspot is obtained, and then the hidden hotspot scanning is initiated by using the name of the hidden hotspot. If the condition of initiating the hidden hotspot scanning is not met, the hidden hotspot scanning is not initiated. In this way, whether the condition of initiating the hidden hotspot scanning is determined before the hidden hotspot scanning is initiated. This effectively reduces a disclosure probability of the name of the hidden hotspot, thereby achieving a purpose of reducing a security risk in hotspot scanning.

Optionally, the electronic device further includes a positioning apparatus, and the positioning apparatus is configured to obtain a current location of the electronic device. The positioning apparatus may obtain a number of a base station connected to the electronic device to identify the current location of the electronic device, for example, a cell 01. The positioning apparatus may alternatively be a GPRS system of the electronic device. For example, the obtained current location of the electronic device is (121 degrees 48 minutes east longitude, 31 degrees 22 minutes north latitude). The positioning apparatus may alternatively be a positioning system in the electronic device. For example, the obtained current location of the electronic device is No. 1800 Jinhai Road.

Optionally, the memory 802 is further configured to store a first mapping relationship. The first mapping relationship includes a mapping relationship between a location of the hidden hotspot and a name of the hidden hotspot. The processor 803 is configured to obtain the name of the hidden hotspot and specifically, obtain the name of the hidden hotspot based on the location of the hidden hotspot and the first mapping relationship.

Optionally, the processor 803 is further configured to obtain a MAC address of a current hidden hotspot, where the current hidden hotspot is a hotspot with an empty name in a result of the common hotspot scanning. The memory 802 is further configured to store a MAC address of the hidden hotspot. The condition of initiating the hidden hotspot scanning is that the MAC address of the current hidden hotspot matches the MAC address of the hidden hotspot stored in the memory.

Optionally, the memory 802 is further configured to store a second mapping relationship. The second mapping relationship includes a mapping relationship between a MAC address of the hidden hotspot and the name of the hidden hotspot. The processor 803 is configured to obtain the name of the hidden hotspot, and specifically, obtain the name of the hidden hotspot based on the second mapping relationship and the MAC address of the hidden hotspot stored in the memory.

It may be understood that FIG. 8 shows merely a simplified design of the electronic device. In actual application, the electronic device may include any quantity of WiFi chips, processors, memories, and the like, and all electronic devices that can implement this application fall within the protection scope of this application.

The processor of the electronic device configured to execute the present invention may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, including a combination of one or more microprocessors, or a combination of the DSP and a microprocessor.

The method or algorithm steps described with reference to the content disclosed in this application may be implemented by hardware, or may be implemented by the processor by executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM, or any other form of storage medium well-known in the art. For example, a storage medium is coupled to the processor, so that the processor can read information from the storage medium or write information into the storage medium. Certainly, the storage medium may alternatively be a component of the processor. The processor and the storage medium may be located in the ASIC. In addition, the ASIC may be located in the electronic device. Certainly, the processor and the storage medium may alternatively exist in the electronic device as discrete components.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement, or improvement made based on technical solutions of this application shall fall within the protection scope of this application.

A person skilled in the art may clearly understand that, for the purpose of convenient and brief description, division of the foregoing function modules is taken as an example for illustration. In actual application, the foregoing functions can be allocated to different function modules and implemented based on a requirement. To be specific, an inner structure of an apparatus is divided into different function modules to implement all or some of the functions described above. For a detailed working process of the foregoing apparatus, refer to a corresponding process in the foregoing method embodiments. Details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An electronic device, comprising a WiFi chip, at least one processor, and a memory, wherein:
   the WiFi chip is configured to initiate common hotspot scanning;
   the memory is configured to store a result of the common hotspot scanning and a name of hidden hotspot;
   the at least one processor is configured to:
      obtain the name of the hidden hotspot in response to determining that the result of the common hotspot scanning comprises a hidden hotspot;
      instruct the WiFi chip to initiate the hidden hotspot scanning by using the name of the hidden hotspot in response to determining that a condition of initiating hidden hotspot scanning is met; and
      skip instructing the WiFi chip to initiate the hidden hotspot scanning in response to determining that the condition of initiating hidden hotspot scanning is not met;
   the WiFi chip is further configured to initiate the hidden hotspot scanning by using the name of the hidden hotspot after receiving an instruction of the processor; and
   the memory is further configured to store a result of the hidden hotspot scanning.

2. The electronic device according to claim 1, wherein the electronic device further comprises a positioning apparatus;
   wherein the positioning apparatus is configured to obtain a location of the electronic device;
   wherein the memory is further configured to store a location of the hidden hotspot; and
   wherein the condition of initiating the hidden hotspot scanning is that the location of the electronic device matches the location of the hidden hotspot stored in the memory.

3. The electronic device according to claim 2, wherein:
   the memory is further configured to store a first mapping relationship, wherein the first mapping relationship comprises a mapping relationship between the location of the hidden hotspot and the name of the hidden hotspot; and
   the at least one processor is configured to obtain the name of the hidden hotspot based on the location of the hidden hotspot and the first mapping relationship.

4. The electronic device according to claim 1, wherein:
   the at least one processor is further configured to obtain a MAC address of the hidden hotspot, wherein the hidden hotspot is a hotspot with an empty name in the result of the common hotspot scanning;
   the memory is further configured to store the MAC address of the hidden hotspot; and
   the condition of initiating the hidden hotspot scanning is that the MAC address of the hidden hotspot matches the MAC address of the hidden hotspot stored in the memory.

5. The electronic device according to claim 4, wherein:
   the memory is further configured to store a second mapping relationship, wherein the second mapping relationship comprises a mapping relationship between the MAC address of the hidden hotspot and the name of the hidden hotspot; and
   the at least one processor is configured to obtain the name of the hidden hotspot based on the second mapping relationship and the MAC address of the hidden hotspot stored in the memory.

6. A hotspot scanning method for an electronic device, wherein the method comprises:
   initiating common hotspot scanning;
   storing a result of the common hotspot scanning;
   obtaining a name of a hidden hotspot in response to determining that the result of the common hotspot scanning comprises the hidden hotspot;
   initiating the hidden hotspot scanning by using the name of the hidden hotspot in response to determining that a condition of initiating hidden hotspot scanning is met;
   storing a result of the hidden hotspot scanning; and
   skipping initiating the hidden hotspot scanning in response to determining that the condition of initiating hidden hotspot scanning is not met.

7. The method according to claim 6, wherein the condition of initiating the hidden hotspot scanning is that a location of the electronic device matches a location of the hidden hotspot stored in a memory of the electronic device.

8. The method according to claim 7, wherein obtaining a name of a hidden hotspot comprises obtaining the name of the hidden hotspot based on the location of the hidden hotspot and a first mapping relationship, and wherein the first mapping relationship comprises a mapping relationship between the location of the hidden hotspot and the name of the hidden hotspot.

9. The method according to claim 7, wherein the condition of initiating the hidden hotspot scanning is that a MAC address of the hidden hotspot matches a MAC address of the hidden hotspot stored in the memory, and wherein the hidden hotspot is a hotspot with an empty name in the result of the common hotspot scanning.

10. The method according to claim 9, wherein obtaining a name of a hidden hotspot comprises obtaining the name of the hidden hotspot based on a second mapping relationship and the MAC address of the hidden hotspot stored in the memory, and wherein the second mapping relationship comprises a mapping relationship between the MAC address of the hidden hotspot and the name of the hidden hotspot.

11. A non-transitory computer-readable storage medium comprising instructions that, when executed by an apparatus, cause the apparatus to:
    initiate common hotspot scanning;
    store a result of the common hotspot scanning;
    obtain a name of a hidden hotspot in response to determining that the result of the common hotspot scanning comprises the hidden hotspot;
    initiate the hidden hotspot scanning by using the name of the hidden hotspot in response to determining that a condition of initiating hidden hotspot scanning is met;
    store a result of the hidden hotspot scanning; and
    skip initiating the hidden hotspot scanning in response to determining that the condition of initiating hidden hotspot scanning is not met.

12. The non-transitory computer-readable storage medium of claim 11, wherein the condition of initiating the hidden hotspot scanning is that a location of the apparatus matches a location of the hidden hotspot stored in a memory of the apparatus.

13. The non-transitory computer-readable storage medium of claim 12, wherein obtaining a name of the hidden hotspot comprises obtaining the name of the hidden hotspot based on the location of the hidden hotspot and a first mapping relationship, and wherein the first mapping relationship comprises a mapping relationship between the location of the hidden hotspot and the name of the hidden hotspot.

14. The non-transitory computer-readable storage medium of claim 12, wherein the condition of initiating the hidden hotspot scanning is that a MAC address of the hidden hotspot matches a MAC address of the hidden hotspot stored in the memory, and wherein the hidden hotspot is a hotspot with an empty name in the result of the common hotspot scanning.

15. The non-transitory computer-readable storage medium of claim 14, wherein obtaining a name of a hidden hotspot comprises obtaining the name of the hidden hotspot based on a second mapping relationship and the MAC address of the hidden hotspot stored in the memory, and wherein the second mapping relationship comprises a mapping relationship between the MAC address of the hidden hotspot and the name of the hidden hotspot.

* * * * *